US010419902B1

(12) United States Patent
Naspolini et al.

(10) Patent No.: US 10,419,902 B1
(45) Date of Patent: Sep. 17, 2019

(54) AGRICULTURAL DATA TRANSPORTATION SYSTEM

(71) Applicant: ARVUS TECNOLOGIA LTDA., Florianópolis (BR)

(72) Inventors: Adriano Correa Naspolini, Florianópolis (BR); Geovany Voi Filho, Florianópolis (BR); Jonatan Vieira, Florianópolis (BR)

(73) Assignee: ARVUS TECNOLOGIA LTDA., Florianópolis (BR)

( * ) Notice: Subject to any disclaimer, the term of this patent is extended or adjusted under 35 U.S.C. 154(b) by 0 days.

(21) Appl. No.: 16/101,231

(22) Filed: Aug. 10, 2018

(51) Int. Cl.
*H04W 4/35* (2018.01)
*H04W 4/029* (2018.01)
*G06Q 50/02* (2012.01)
*A01D 91/00* (2006.01)
*H04W 4/44* (2018.01)

(52) U.S. Cl.
CPC .............. *H04W 4/35* (2018.02); *A01D 91/00* (2013.01); *G06Q 50/02* (2013.01); *H04W 4/029* (2018.02); *H04W 4/44* (2018.02)

(58) Field of Classification Search
CPC ......... H04W 4/35; H04W 4/44; H04W 4/209; G06Q 50/02; G06Q 40/04; G06F 19/00; G06G 7/48; G06T 7/001; G06T 17/30256; A01D 91/00
USPC ............... 340/988, 993; 701/50, 212; 702/5; 703/11; 705/7.11, 37
See application file for complete search history.

(56) References Cited

U.S. PATENT DOCUMENTS

| | | | |
|---|---|---|---|
| 6,216,071 B1 * | 4/2001 | Motz ................ | A01D 41/12 340/988 |
| 2012/0109614 A1 * | 5/2012 | Lindores ............ | A01B 79/005 703/11 |
| 2018/0108123 A1 * | 4/2018 | Baurer ............... | A01G 7/00 |

* cited by examiner

*Primary Examiner* — Hung T Nguyen
(74) *Attorney, Agent, or Firm* — Maschoff Brennan

(57) ABSTRACT

The invention relates to an agricultural tracker for a crop trailer, the Tracker provided for crop load traceability and data transportation from a cropping area to a destination, the crop trailer being towable by a hauler in the cropping area, the crop trailer being fillable by a harvester with crop during a harvest, the crop trailer being towable by a transporter during a transport between the cropping area and the mill, the crop trailer having a power line, the power line being designed to be connectable to an on-board computer of the transporter, to a power source of the transporter, and to the crop trailer.

20 Claims, 3 Drawing Sheets

AGRICULTURAL DATA TRANSPORTATION SYSTEM

FIELD OF THE INVENTION

The present invention relates to an Agricultural Tracker for a crop trailer, the Tracker provided for the purpose of crop load traceability and data transportation from a cropping area to a storage or mill.

BACKGROUND TO THE INVENTION

In agriculture, a harvesting operation involves a harvester (i.e. the machine responsible for cutting the crop, but with no storage compartment or sometimes with a small buffer) and a hauler set comprising a towing vehicle which tows one or more crop trailers and moves side by side with the harvester such that a crop trailer receives the harvested crops. The hauler set is a specialized machine designed to be able to transit in the farm environment (e.g. mud, dust, ground holes, etc). After the hauler set is full, it drives to a place in the farm and unloads the crop into another type of trailer cart, which then can be hooked on a transporter (i.e. a vehicle which can run on a public road, highway or railway), composing a transporter set. The transporter set will deliver the harvested crop to a destination facility (i.e. a port, storage or any part of the infrastructure of a mill such as a barn, a silo, etc.).

In a different operation, the crop does not need to be transferred from trailer to trailer, since the crop trailer is used by both the hauler and the transporter. Instead, after the crop trailer is filled with crop, the crop trailer can be unhooked from the hauler (in particular and parked at the side of the cropping area) and (later) be hooked to the transporter. However, it is not unusual to have two kinds of trailers because a trailer for the cropping area may have any weight, height, width, and length, while a trailer towed on public roads must of course follow traffic laws and is hence designed with restrictions.

In a further operation, a hauler is not involved, but the crop trailer is towed by the transporter, which could both transit in public roads but also in the farm environment.

In the following description, for the sake of conciseness, it is mostly but not exclusively referred to the first case, i.e. to the provision of a hauler with hauler trailers (hauler set) for the cropping area and a transporter with crop trailers (transporter set) for the travel to the destination facility.

When the transporter set arrives at the destination facility, it navigates to a scale such that the crop load can be weighted. In some cases, a destination facility receives crops from different sources (from different farms and from different growers) and it is therefore important to securely define the source of the load (e.g. for a grower payment, or for operator or machine performance analysis). All these three involved vehicles (harvester, hauler, and transporter) have an on-board computer which is a device for machine interaction and data logging, including GNSS positioning.

During the time the hauler set drives side by side with the harvester, the on-board computer of each of these two machines are wirelessly connected, so the harvester can transmit to the hauler information related to the crop being loaded to it (e.g. farm site, farm plot, harvester engine data, positioning, etc).

During the time the hauler set is side by side with a transporter set for crop transferring, their on-board computers may also establish a wireless connection and the hauler on-board computer may transmit its own haul data but also the harvest data it had received from the harvester to the transporter on-board computer.

However, if the transporter is not present at the cropping area, but only the crop trailer of the transporter set, then there is no way the hauler on-board computer can communicate with the transporter on-board computer for transmitting the above mentioned data. Accordingly, it is common that there is more than one crop trailer per transporter, the crop trailers are left alone aside of the cropping area, waiting for a hauler set to load it (when the trailer is still empty), or waiting until a transporter arrives later to hook it and transport it to the destination facility (when the trailer is full already).

OBJECT OF THE INVENTION

The invention provides an agricultural tracker which can be attached to a crop trailer. This tracker ensures that the data acquired in the field arrive their target destination reliably, without interruption, and quickly.

SUMMARY OF THE INVENTION

The invention relates to an agricultural tracker for a crop trailer, the crop trailer being fillable by a harvester with crop in a cropping area, the tracker provided for crop traceability and data transportation from the cropping area to a destination facility, the crop trailer being towable by a transporter during transport between the cropping area and the destination facility, the crop trailer having a power line, the power line being designed to be connectable to a power source of the transporter, the tracker comprising a housing configured for being attachable to the crop trailer, and, arranged in the housing, a wire-based adapter configured for establishing over the power line a power connection to the power source of the transporter, a first wireless adapter configured for establishing a wireless data connection to at least one further wireless adapter, a memory unit, a processing unit configured for storing in the memory unit harvest data received from the harvester and transportation data received from the transporter, wherein the harvest data are based on time-tagged positions of the harvester in the cropping area, and wherein the transportation data are based on time-tagged positions of the transporter between the cropping area and the destination facility, and a battery configured for supplying the tracker with electrical power and being chargeable over the power connection.

The agricultural tracker may further comprise an Inertial Measuring Unit (IMU) configured for, while the housing is attached to the crop trailer, detecting a movement of the crop trailer, wherein the processing unit may be configured for initiating the storing of at least one of the harvest data and the transportation data based on whether a movement is detected by the IMU.

The power line may be designed to be connectable to an on-board computer of the transporter, and wherein the wire-based adapter may be configured for establishing over the power line a wired data connection to the on-board computer of the transporter. The transportation data may be received over the wired data connection.

The transportation data may be received over the wireless data connection. The first wireless adapter may be configured for establishing the wireless data connection to at least one of a second wireless adapter comprised by a harvester, a third wireless adapter comprised by a hauler, a fourth wireless adapter comprised by a transporter, a fifth wireless adapter comprised by the destination facility, and a sixth wireless adapter comprised by a further agricultural tracker according to the description herein.

The harvest data may be received over the wireless data connection.

The harvest data may be received from the second wireless adapter or from the third wireless adapter.

The processing unit may be configured for storing in the memory unit haul data received over the wireless data connection from the third wireless adapter, wherein the haul data may be based on time-tagged positions of the hauler.

The agricultural tracker may be configured for transmitting at least one of the stored transportation data, the stored haul data, and the stored harvest data over the wireless connection to at least one of the fourth wireless adapter, the fifth wireless adapter, and the sixth wireless adapter.

The harvest data may be based on at least one of time-tagged crop types, time-tagged identification references of the harvester, time-tagged identification references of the cropping area, time-tagged operation statuses of the harvester, time-tagged operation types of the harvester, productivity of the harvester, and yield of the harvester.

The transportation data, the haul data, and the harvest data may be based on time-tagged identification references of an operator of the transporter, the hauler, and the harvester respectively.

The transportation data may be based on at least one of time-tagged crop types, time-tagged identification references of the harvester, time-tagged identification references of the cropping area, and time-tagged operation statuses of the transporter.

The first wireless adapter may be configured for automatically establishing the wireless data connection to a further wireless adapter when a distance between the further wireless adapter and the tracker falls below a threshold value.

The wire-based adapter may be configured for automatically establishing the wired data connection when the housing is attached to the crop trailer.

The wire-based adapter may comprise a serial bus interface or a CAN bus interface. The wireless data connection may be based on WiFi, Bluetooth, or digital radio.

The processing unit may be configured for transmitting at least one of the stored transportation data, the stored haul data, and the stored harvest data to the on-board computer of the transporter over the wired data connection.

The first wireless adapter may be configured for establishing a wireless data connection to a seventh wireless adapter comprised by a cellular device such as a mobile phone or a tablet computer, and wherein the processing unit may be configured for transmitting the transportation data, harvest data, and haul data to the destination facility via the further adapter comprised by the cellular device before the transporter arrives at the destination facility.

The on-board computer of the transporter may have a cellular adapter, wherein the processing unit may be configured for transmitting the stored transportation data, the stored harvest data, and the stored haul data to the destination facility via the on-board computer of the transporter before the transporter arrives at the destination facility.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
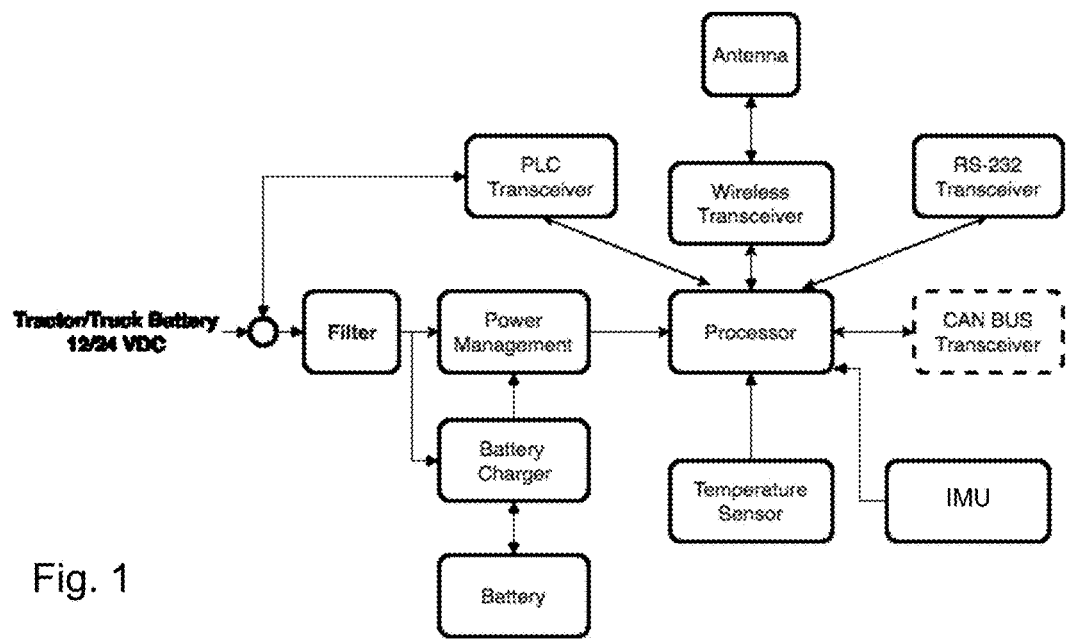
FIG. 1 shows a block diagram of an exemplary embodiment the invention.

The agricultural tracker according to the invention can be attached to a crop trailer, and by way of this attachment, a power connection is established through the power line of the crop trailer supplying electrical power to the tracker from the towing vehicle, i.e. the transport or the hauler. In particular, also a data connection can be established because the power line may also lead to an on-board computer of the transporter or the hauler. To be able to work in case the crop trailer is standing alone in the field, the tracker has a rechargeable battery for power supply. When the crop trailer is attached to a vehicle, the power line of the crop trailer is connected the towing vehicle and with that, the tracker is provided with power (so it also can recharge the battery). A data communication may as well be established by which the tracker can "talk by wire" to the on-board computer of the transporter cab.

With the power line communication (PLC), an infrastructure is used that is already available on the trailer (for vehicle road lights, indicators, and brake lights). However, the tracker may have abilities to connect to a CAN bus or serial bus.

The tracker has a wireless network adapter which may work in three ways, depending on the situation: (a) as access point so other devices can connect to it; (b) as a common Wi-Fi device so it can connect to an access point; or (c) an ad-hoc network device, so no access point is needed. With this wireless link, the tracker can connect to the on-board computer of the hauler and receive haul data, in particular also harvest data that the hauler on-board computer receives from the harvester on-board computer. Alternatively, the tracker can connect to both the harvester and the hauler to receive the respective data separately. In an embodiment, the tracker receives only the harvest data from the harvester. That is, the hauler sets do not need to log any data, so the hauler on-board computer is not necessary and the tracker can communicate directly to the harvester.

The harvest data comprise or base upon operating times, locations, and types of crop, etc. during the harvest and haul data are similar information just with respect to the hauler.

Since the transport may also be the hauler (because the transporter may be designed to drive in the cropping area and also on the normal road), optionally, the tracker may also receive the haul data as they are generated by the transporter. The tracker can generally also be configured to wirelessly connect to the transporter in the described way.

Every crop trailer may have an ID which uniquely identifies it to the hauler on-board computer or to the transporter on-board computer, so when it is physically attached, the hauler computer can unambiguously determine which trailer is being pulled. The same PLC may be used to transmit haul data and/or harvest data to the respective on-board computer and vice-versa. Using the wireless data connection, the tracker may also transmit its data content to further trackers (attached to other crop trailer which are nearby).

This all happens on or around the field. However, when the crop trailer arrives at the destination facility, the tracker collected transportation data (received from the on-board computer of the transporter during the trip) over the PLC, and the haul data and the harvest data over the wireless connection (at the cropping area). These data are stored in the memory unit of the tracker, and can then be transmitted to a network infrastructure of the destination facility (e.g. mill) via the wireless connection.

The on-board computers can have a display for human interaction. This allows a driver e.g. to manually trigger data transfers or to add extra data, such as explanatory notes for a delay.

The tracker may be designed to work properly with a wide range of external power supply attached to it or without this external power supply. For example, the tracker may comprise solar panels which provide sufficient electrical power in the field which it needs when the trailer is unplugged from a PLC.

In an embodiment of the agricultural tracker only harvest data and transport data are stored by the processing unit. The harvest data can be received during the harvest directly from the harvester over the PLC or over the wireless data connection. The harvest data are generated by the harvester and represent at least the route of the harvest over time.

In other embodiments, the harvest data reach the tracker via a hauler or transporter, i.e. the hauler or transporter drives side by side to the harvester and collects the harvest data wirelessly. Afterwards, the harvest data can be transferred from the hauler or transporter to the tracker via PLC or via the wireless data connection. When a transporter is transporting the filled crop trailer from the cropping area to a destination facility, transportation data are stored in the tracker. These transportation data are generated by the transporter and can reach the tracker via the PLC or via the wireless data connectivity.

In another embodiment, the crop collected on the field is transferred to a crop trailer suitable for public roads. The tracker is attached to this crop trailer and has not been on the field. For receiving the harvest data, the tracker can establish a wireless connection to the vehicle (hauler or transporter) that was towing the provisional hauler trailer which was filled on the field with crop by the harvester. The hauler or transporter collected the harvest data during the harvest on the field by receiving them from the harvester. While the crop is loaded to the crop trailer, the harvest data can be transferred from the hauler or transporter to the tracker via the wireless data connection.

In a further embodiment, the hauler that tows either a provisional hauler trailer or the crop trailer over the field is generating additional haul data. The haul data are, analogue to the harvest data, time-tagged position data of the hauler. During the harvest, the haul data are similar to the harvest data (only with some sort of offset). However, with the haul data, also the route of the hauler can be tracked, when there is no harvest operation. For example, the way from the field (a) to the place where the crop is loaded from the hauler trailer to a crop trailer can be logged as haul data, or respectively, (b) to the place where the crop trailer is unhooked from the hauler and hooked onto the transporter (in both cases (a) and (b) usually a side of the cropping area). In case (a), the haul data are transferred wirelessly from the hauler to the tracker, and in case (b), the haul data can be transferred wirelessly from the hauler to the tracker or over the power line.

FIG. 1 shows a block diagram of an exemplary embodiment of an agricultural tracker as provided by the present invention. Before being processed by the power management block, the supply voltage can be filtered by the filter block to eliminate noise and the power line communication carrier signal. For occasions when the tracker is disconnected from the truck electrical system, the hardware has an alternative voltage supply option provided by an integrated battery. Such battery is charged when the tracker is connected to external voltage supply.

A temperature sensor can e.g. be used for any of time-tagged temperature tracking, diagnostics, and for lowering the battery charge voltage at high temperatures. The tracker can have an RS232 and/or CAN Bus output. This connection can be used for communication with others equipment. There is a built-in antenna used for the wireless communication, but it may also be external. An IMU, e.g. accelerometer sensor, can be used to detect movements of the crop trailer and, more specifically, trigger events such as recording or retrieving of data.

Figure 2:
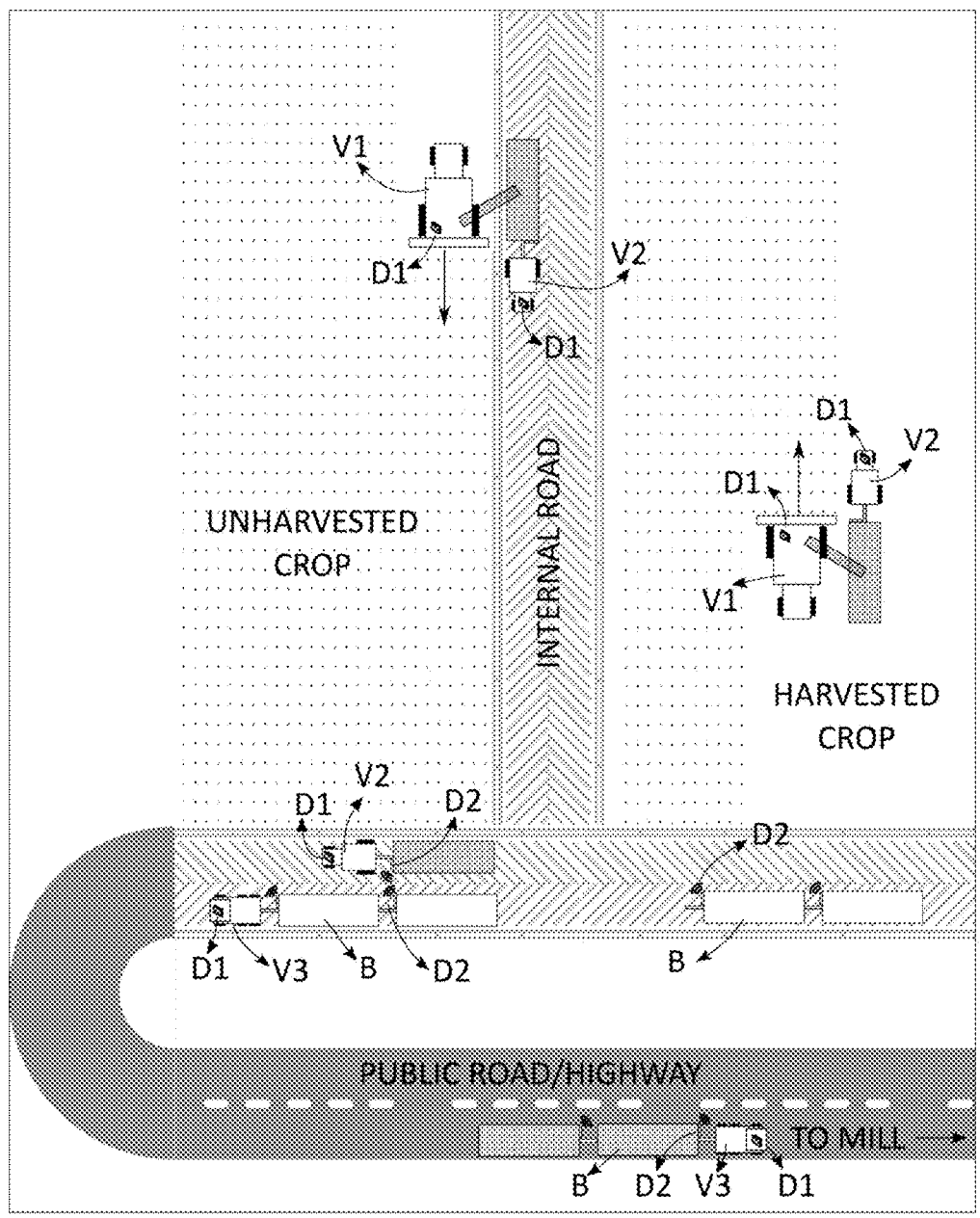
FIG. 2 shows a bird's eye view of a harvesting, hauling and transportation scene where a tracker according to the invention can be employed.

FIG. 2 shows a bird's eye view of an exemplary cropping area, where there are harvesters V1 which are cutting crops and transferring them to hauler trailers which are pulled by haulers V2. As can be seen in the figure, some crop trailers B are parked at the side of the field, waiting to be loaded by the hauler V2 and later to be picked up by a transporter V3 when they are full. Transporters V3 pick up the crop loaded trailers B and transfer them to their destination over the road. Hauler sets (V2+hauler trailer) are usually specialised vehicles for farm ground, so their tasks are (a) to accompany the harvesters V1 during the harvest to get loaded, and (b) to unload the crop into a crop trailer B. The crop trailers B may be standing alone or may be already attached to a transporter V3.

Definitions

Figure 3:
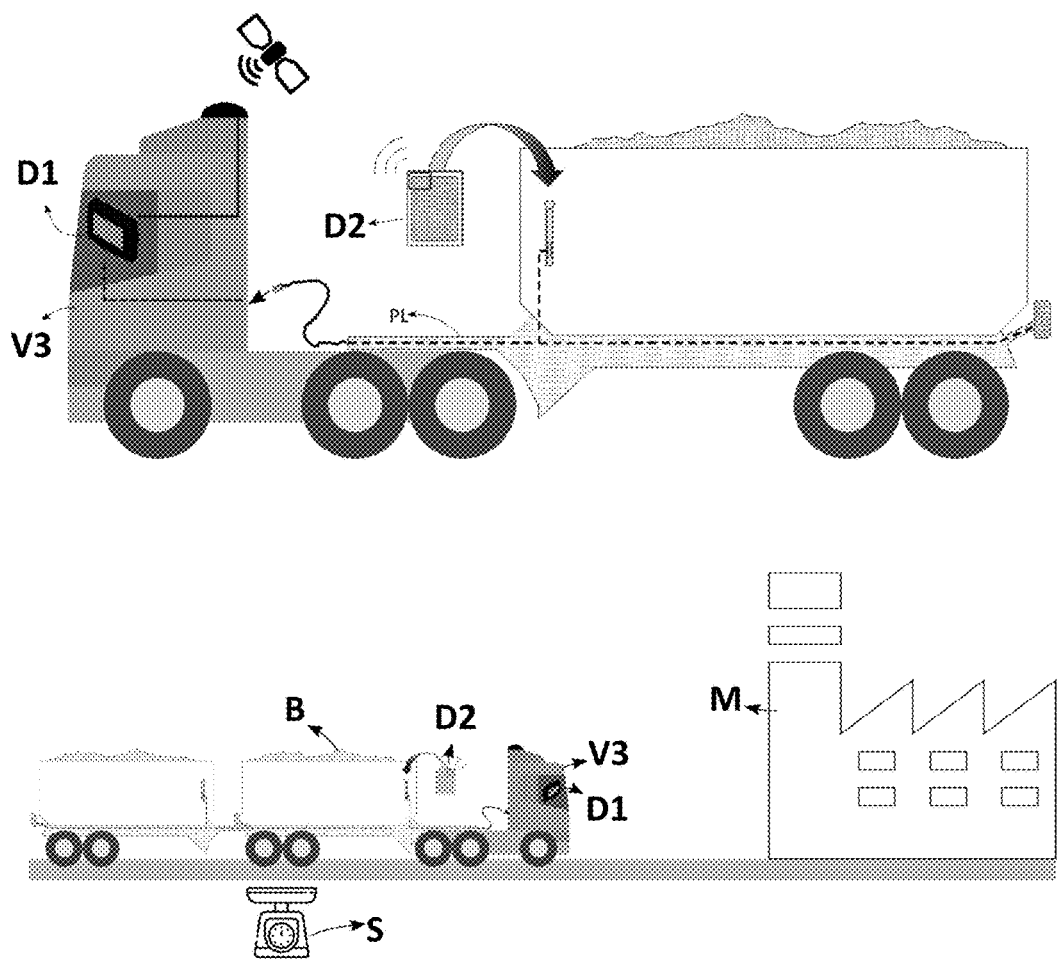
FIG. 3 shows transporter towing a crop trailer to which a tracker according to the invention is attachable

V1: Harvester
V2: Hauler (usually a Tractor or Truck)
V3: Transporter (usually a Truck)
D1: On-board computer (may have a display for HMI)
D2: Agricultural tracker
B: Crop Trailer
S: Scale
PL: Power Line
M: Mill FIG. 3 shows a transporter V3 with an on-board computer D1 which is connected over the PL connection with the tracker D2. The computer D1 is connected to a Global Navigation Satellite System (GNSS) comprised by the transporter V3. Based on position data obtained with help of the GNSS, the computer D1 can generate and provide transportation data to the tracker. The power line also supplies the breaking lights of the trailer. The tracker can, as shown in the figure, have a housing similar to a tablet computer. By way of an example, the housing of the tracker may have a sliding shoe by which it can be attached to the crop trailer B. This slide mechanism may lock in in a position where a wire-based connecting interface of the housing may come into contact with an interface of the PLC on side of the crop trailer. The trailer B may have such an interface at multiple places/sides so the position of the tracker can vary. The tracker may e.g. also comprise a display, such as an energy-efficient e-ink display, for displaying some basic information, e.g. crop type, vendor ID, vendee ID, crop origin, outside temperature, etc.

Arrived at the mill, the tracker D2 can transmit the stored transportation data, haul data, and harvest data to the scale or to any other entity at the mill site M. Further, the tracker D2 can, over the wired data connection or over the wireless data connection, receive weight data from the scale, which then could be assigned to (i.e. stored) or matched with the harvest data.

Although the invention is illustrated above, partly with reference to some preferred embodiments, it must be understood that numerous modifications and combinations of different features of the embodiments can be made. All of these modifications lie within the scope of the appended claims.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. An agricultural tracker for a crop trailer, the crop trailer being fillable by a harvester with crop in a cropping area, the tracker provided for crop traceability and data transportation from the cropping area to a destination facility, the crop trailer being towable by a transporter during transport between the cropping area and the destination facility, the crop trailer having a power line, the power line being designed to be connectable to a power source of the transporter, the tracker comprising:
    a housing configured for being attachable to the crop trailer, and
arranged in the housing,
    a wire-based adapter configured for establishing over the power line a power connection to the power source of the transporter,
    a first wireless adapter configured for establishing a wireless data connection to at least one further wireless adapter,
    a memory unit,
    a processing unit configured for storing in the memory unit harvest data received from the harvester and transportation data received from the transporter, wherein the harvest data are based on time-tagged positions of the harvester in the cropping area, and wherein the transportation data are based on time-tagged positions of the transporter between the cropping area and the destination facility, and
    a battery configured for supplying the tracker with electrical power and being chargeable over the power connection.

2. The agricultural tracker according to claim 1, comprising an Inertial Measuring Unit (IMU) configured for, while the housing is attached to the crop trailer, detecting a movement of the crop trailer, wherein the processing unit is configured for initiating the storing of at least one of the harvest data and the transportation data based on whether a movement is detected by the IMU.

3. The agricultural tracker according to claim 1, wherein the power line being designed to be connectable to an on-board computer of the transporter, and wherein the wire-based adapter is configured for establishing over the power line a wired data connection to the on-board computer of the transporter.

4. The agricultural tracker according to claim 3, wherein the transportation data are received over the wired data connection.

5. The agricultural tracker according to claim 1, wherein the transportation data are received over the wireless data connection.

6. The agricultural tracker according to claim 1, wherein the first wireless adapter is configured for establishing the wireless data connection to at least one of:
    a second wireless adapter comprised by a harvester,
    a third wireless adapter comprised by a hauler,
    a fourth wireless adapter comprised by a transporter,
    a fifth wireless adapter comprised by the destination facility, and
    a sixth wireless adapter comprised by the agricultural tracker.

7. The agricultural tracker according to claim 1, wherein the harvest data are received over the wireless data connection.

8. The agricultural tracker according to claim 7, wherein the harvest data are received from the second wireless adapter or from the third wireless adapter.

9. The agricultural tracker according to claim 6, wherein the processing unit is configured for storing in the memory unit haul data received over the wireless data connection from the third wireless adapter, wherein the haul data are based on time-tagged positions of the hauler.

10. The agricultural tracker according to claim 6, configured for transmitting at least one of the stored transportation data, the stored haul data, and the stored harvest data over the wireless connection to at least one of the fourth wireless adapter, the fifth wireless adapter, and the sixth wireless adapter.

11. The agricultural tracker according to claim 1, wherein the harvest data are based on at least one of:
    time-tagged crop types,
    time-tagged identification references of the harvester,
    time-tagged identification references of the cropping area,
    time-tagged operation statuses of the harvester,
    time-tagged operation types of the harvester,
    productivity of the harvester, and
    yield of the harvester.

12. The agricultural tracker according to claim 1, wherein the transportation data, the haul data, and the harvest data are based on time-tagged identification references of an operator of the transporter, the hauler, and the harvester respectively.

13. The agricultural tracker according to claim 1, wherein the transportation data are based on at least one of:
    time-tagged crop types,
    time-tagged identification references of the harvester,
    time-tagged identification references of the cropping area, and
    time-tagged operation statuses of the transporter.

14. The agricultural tracker according to claim 1, wherein the first wireless adapter is configured for automatically establishing the wireless data connection to a further wireless adapter when a distance between the further wireless adapter and the tracker falls below a threshold value.

15. The agricultural tracker according to claim 1, wherein the wire-based adapter is configured for automatically establishing the wired data connection when the housing is attached to the crop trailer.

16. The agricultural tracker according to claim 1, wherein the wire-based adapter comprises a serial bus interface or a CAN bus interface.

17. The agricultural tracker according to claim 1, wherein the wireless data connection is based on WiFi, Bluetooth, or digital radio.

18. The agricultural tracker according to claim 3, wherein the processing unit is configured for transmitting at least one of the stored transportation data, the stored haul data, and the stored harvest data to the on-board computer of the transporter over the wired data connection.

19. The agricultural tracker according to claim 1, wherein the first wireless adapter is configured for establishing a wireless data connection to a seventh wireless adapter comprised by a cellular device such as a mobile phone or a tablet computer, and wherein the processing unit is configured for transmitting the transportation data, harvest data, and haul data to the destination facility via the further adapter comprised by the cellular device before the transporter arrives at the destination facility.

20. The agricultural tracker according to claim 1, wherein the on-board computer of the transporter has a cellular adapter, and wherein the processing unit is configured for transmitting the stored transportation data, the stored harvest data, and the stored haul data to the destination facility via the on-board computer of the transporter before the transporter arrives at the destination facility.

* * * * *